United States Patent
Schneider

(10) Patent No.: US 10,304,236 B2
(45) Date of Patent: May 28, 2019

(54) METHODS AND SYSTEMS FOR SEGMENTED VOLUME RENDERING

(71) Applicant: Siemens Healthcare GmbH, Erlangen (DE)

(72) Inventor: Robert Schneider, Rosstal (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 103 days.

(21) Appl. No.: 15/456,999

(22) Filed: Mar. 13, 2017

(65) Prior Publication Data

US 2018/0260996 A1    Sep. 13, 2018

(51) Int. Cl.
*G06T 15/08* (2011.01)
*G06T 15/04* (2011.01)
*G06T 15/50* (2011.01)

(52) U.S. Cl.
CPC .............. *G06T 15/08* (2013.01); *G06T 15/04* (2013.01); *G06T 15/50* (2013.01); *G06T 2210/41* (2013.01)

(58) Field of Classification Search
None
See application file for complete search history.

(56) References Cited

U.S. PATENT DOCUMENTS

| | | | | |
|---|---|---|---|---|
| 2004/0109603 A1* | 6/2004 | Bitter | ....................... | G06T 15/08 382/154 |
| 2005/0143654 A1* | 6/2005 | Zuiderveld | ............. | G06T 15/08 600/443 |
| 2007/0237038 A1 | 10/2007 | Li et al. | | |
| 2008/0095414 A1* | 4/2008 | Desh | ..................... | G06T 11/006 382/128 |
| 2009/0103793 A1 | 4/2009 | Borland | | |
| 2012/0308107 A1 | 12/2012 | Engel et al. | | |
| 2018/0053334 A1 | 2/2018 | Schneider | | |

FOREIGN PATENT DOCUMENTS

| DE | 102011076929 A1 | 12/2012 |
|---|---|---|
| EP | 3239932 A1 | 11/2017 |
| WO | WO 2006099490 A1 | 9/2006 |

OTHER PUBLICATIONS

Drebin, Robert A.; Carpenter, Loren; Hanrahan, Pat (1988), "Proceedings of the 15th annual conference on Computer graphics and interactive techniques—SIGGRAPH '88", ACM Press, pp. 65-74, 1988.

(Continued)

*Primary Examiner* — Andrew G Yang
(74) *Attorney, Agent, or Firm* — Harness, Dickey & Pierce, P.L.C.

(57) ABSTRACT

In one example embodiment, a method for visualizing using a rendering technique in which voxels are sampled along a ray through a volume, the method includes obtaining voxel data, modifying a first portion of the voxel data, the first portion of the voxel data associated with a first segmentation mask. The modifying includes setting the first portion of the voxel data to at least one of a plurality of permitted voxel values. The method further includes applying a set of operators to the modified first portion of the voxel data and a remaining portion of the voxel data and displaying the volume based on the applied first set of operators.

20 Claims, 12 Drawing Sheets

(56) References Cited

OTHER PUBLICATIONS

Engel K., Kraus M., Ertl T.; "High quality pre-integrated vol. rendering using hardware accelerated pixel shading. In Proceedings Graphics Hardware 2001 (2001)," Mark W., Schilling A., (Eds.), ACM Press, pp. 9-16, 2001.
Röttger, Stefan; Guthe, Stefan; Weiskopf, Daniel; Ertl, Thomas; Straßer, Wolfgang, "Smart Hardware-Accelerated Volume Rendering," Proceedings of EG/IEEE TCVG Symposium on Visualization VisSym '03, S. 231-238, 2003.
F. Roessler, E. Tejada, T. Fangmeier, T. Ertl, "GPU-based Multi-Volume Rendering for the Visualization of Functional Brain Images," Proceedings of SimVis, 315-318, 2006.
Extended European Search Report dated Aug. 20, 2018.

\* cited by examiner

METHODS AND SYSTEMS FOR SEGMENTED VOLUME RENDERING

BACKGROUND

Volume rendering is a general method to composite three-dimensional (3D) digital volumetric data onto a two-dimensional (2D) image. The quality and appearance of the resulting image can vary widely from one volume rendering engine to another due to the choice of different tradeoffs in different implementations.

For volume rendering, structures may be masked from the volume data. The mask may be drawn by a user of the rendering system or a predetermined structure.

Examples of masks include a punch mask and a show mask. A punch mask has a transfer function with an opacity of zero everywhere assigned to the mask and masks with a different transfer function (i.e., not zero everywhere) may be referred to as show masks.

Punch masks are used in volume rendering to avoid rendering masked structures. Geometric punching information is converted to a punching volume. The punching volume defines, for each voxel, whether the voxel is masked out.

Thus, when performing segmented volume rendering, two kinds of segmentation boundaries occur. One is a boundary of a segmentation mask and the other is a boundary surface that is implicitly defined by a transfer function which separates regions that have zero and nonzero opacity.

SUMMARY

The inventor has discovered a method and system for segmented volume rendering in which a discrepancy between a mask boundary created by a segmentation mask and a boundary implicitly defined by a transfer function is reduced.

At least one example embodiment provides a method for visualizing using a rendering technique in which voxels are sampled along a ray through a volume. The method includes obtaining voxel data, modifying a first portion of the voxel data, the first portion of the voxel data associated with a first segmentation mask, the modifying including setting the first portion of the voxel data to at least one of a plurality of permitted voxel values. The method further includes applying a set of operators to the modified first portion of the voxel data and a remaining portion of the voxel data and displaying the volume based on the applied set of operators.

In an example embodiment, the setting sets the first portion of the voxel data to a uniform value, the uniform value being within the plurality of permitted voxel values.

In an example embodiment, the setting the first portion of the voxel data includes determining the plurality of permitted voxel values and determining the uniform value as the largest value within the plurality of permitted voxel values.

In an example embodiment, an opacity function generates an opacity of zero for all voxel values in the plurality of permitted voxel values such that for each element of the plurality of permitted voxel values the opacity is zero and an opacity for all values smaller than the element are also zero.

In an example embodiment, the applying includes determining a color function of the ray among an initial color function and a modified color function, the modified color function associated with the uniform value, determining an opacity function of the ray among an initial opacity function and a modified opacity function, the modified opacity function associated with the uniform value, the determined color function being the modified color function when an opacity at an arc length is less using the modified opacity function than an opacity at the arc length using the initial opacity function, the determined opacity function being the modified opacity function when the opacity at the arc length is less using the modified opacity function than the opacity at the arc length using the initial opacity function and applying the determined color function and the determined opacity function to the voxel data.

In an example embodiment, the determined color function represents color values over intervals of the ray, respectively, and the determined opacity function represents opacity values over the intervals, respectively, of the ray.

In an example embodiment, the determining of the color function includes obtaining the color values and the opacity values from a preintegration table.

In an example embodiment, $$W^p = \{w | a^p(x,x) = 0 \forall x \leq w\};$$

$$w_{opt} = \max(W^p)$$

where x is a voxel value, $a^p(x,x)$ is an opacity value in the preintegration table where a start and an end of the interval is associated with the voxel value and $w_{opt}$ is the uniform value.

In an example embodiment, the first portion of the voxel data is associated with voxels at only a boundary of the first segmentation mask.

In an example embodiment, the method further includes determining the boundary using a binary optimization mask.

In an example embodiment, the setting the first portion of the voxel data includes obtaining a minimum value of the voxel data, determining an expanded minimum value, the expanded minimum value being less than the obtained minimum value, setting a color and an opacity for a voxel value having the expanded minimum value to be zero and determining the uniform value to be the expanded minimum value.

In an example embodiment, the method further includes second modifying a second portion of the voxel data, the second portion of the voxel data associated with a second segmentation mask, the second modifying including setting the second portion of the voxel data to a second uniform value. The method further includes applying the set of operators to the modified second portion of the voxel data and the first portion of the voxel data. The displaying displays the volume based on the applied set of operators to the modified first portion of the voxel data and the applied set of operators to the modified second portion of the voxel data.

In an example embodiment, the setting the second portion of the voxel data includes determining a set of permitted values for the second uniform value and determining the second uniform value as the largest value within the set of permitted values.

In at least one example embodiment, the at least one of the plurality of permitted voxel values is an optimized value.

In an example embodiment, the first segmentation mask is a first show mask and the method further includes modifying a second portion of the voxel data, the second portion of the voxel data associated with a second show mask, the modifying including setting the second portion of the voxel data to at least one of a second plurality of permitted voxel values, applying the set of operators to the modified second portion of the voxel data and the voxel data excluding the modified second portion and displaying the volume based on the applied set of operators.

At least one example embodiment provides a system for visualizing a volume. The system includes a memory storing computer-readable instructions and at least one processor configured to execute the computer-readable instructions to obtain voxel data, modify a first portion of the voxel data, the first portion of the voxel data associated with a first segmentation mask, the modifying including set the first portion of the voxel data to at least one of a plurality of permitted voxel values. The at least one processor is configured to execute the computer-readable instructions to apply a set of operators to the modified first portion of the voxel data and a remaining portion of the voxel data and display the volume based on the applied set of operators.

In at least one example embodiment, the at least one processor is configured to execute the computer-readable instructions to set the first portion of the voxel data to a uniform value, the uniform value being within the plurality of permitted voxel values.

In at least one example embodiment, the at least one processor is configured to execute the computer-readable instructions to determine the plurality of permitted voxel values and determine the uniform value as the largest value within the plurality of permitted voxel values.

In at least one example embodiment, an opacity function generates an opacity of zero for all voxel values in the plurality of permitted voxel values such that for each element of the plurality of permitted voxel values the opacity is zero and an opacity for all values smaller than the element are also zero.

In at least one example embodiment, the at least one processor is configured to execute the computer-readable instructions to determine a color function of a ray among an initial color function and a modified color function, the modified color function associated with the uniform value, determine an opacity function of a ray among an initial opacity function and a modified opacity function, the modified opacity function associated with the uniform value, the determined color function being the modified color function when an opacity at an arc length is less using the modified opacity function than an opacity at the arc length using the initial opacity function, and apply the determined color function and the determined opacity function to the voxel data.

In at least one example embodiment, the determined color function represents color values over intervals of the ray, respectively, and the determined opacity function represents opacity values over the intervals, respectively, of the ray.

In at least one example embodiment, the first portion of the voxel data is associated with voxels at only a boundary of the first segmentation mask.

In at least one example embodiment, the at least one processor is configured to execute the computer-readable instructions to determine the boundary using a binary optimization mask.

In at least one example embodiment, the at least one processor is configured to execute the computer-readable instructions to obtain a minimum value of the voxel data, determine an expanded minimum value, the expanded minimum value being less than the obtained minimum value, set a color and an opacity for a voxel value having the expanded minimum value to be zero, and determine the uniform value to be the expanded minimum value.

In at least one example embodiment, the at least one processor is configured to execute the computer-readable instructions to modify a second portion of the voxel data by setting the second portion of the voxel data to a second uniform value, the second portion of the voxel data associated with a second segmentation mask, and apply the set of operators to the modified second portion of the voxel data and the first portion of the voxel data, wherein the at least one processor is configured to execute the computer-readable instructions to display the volume based on the applied set of operators to the modified first portion of the voxel data and the applied set of operators to the modified second portion of the voxel data.

In at least one example embodiment, the at least one of the plurality of permitted voxel values is an optimized value.

In at least one example embodiment, the first segmentation mask is a first show mask and the at least one processor is configured to execute the computer-readable instructions to modify a second portion of the voxel data by setting the second portion of the voxel data to at least one of a second plurality of permitted voxel values, the second portion of the voxel data associated with a second show mask, apply the set of operators to the modified second portion of the voxel data and the voxel data excluding the modified second portion and display the volume based on the applied set of operators.

At least one example embodiment provides a non-transitory computer-readable medium, when executed by at least one processor, configured to cause the at least one processor to obtain voxel data, modify a first portion of the voxel data, the first portion of the voxel data associated with a first segmentation mask, the modifying including, set the first portion of the voxel data to at least one of a plurality of permitted voxel values, apply a set of operators to the modified first portion of the voxel data and a remaining portion of the voxel data and display a volume based on the applied set of operators.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 illustrates a system for segmented volume rendering according to an example embodiment;

FIG. 4 illustrates a method of segmented volume rendering according to an example embodiment;

FIG. 5 illustrates an example embodiment of a portion of applying the operators shown in FIG. 4;

FIG. 7 illustrates an example embodiment of modifying a first portion of voxel data where a show mask has an opacity of non-zero for its smallest index such that a set of permitted voxel values is empty; and FIG. 8 illustrates an example embodiment of volume rendering in which a boundary is defined between two show masks.

DETAILED DESCRIPTION

Figure 1:
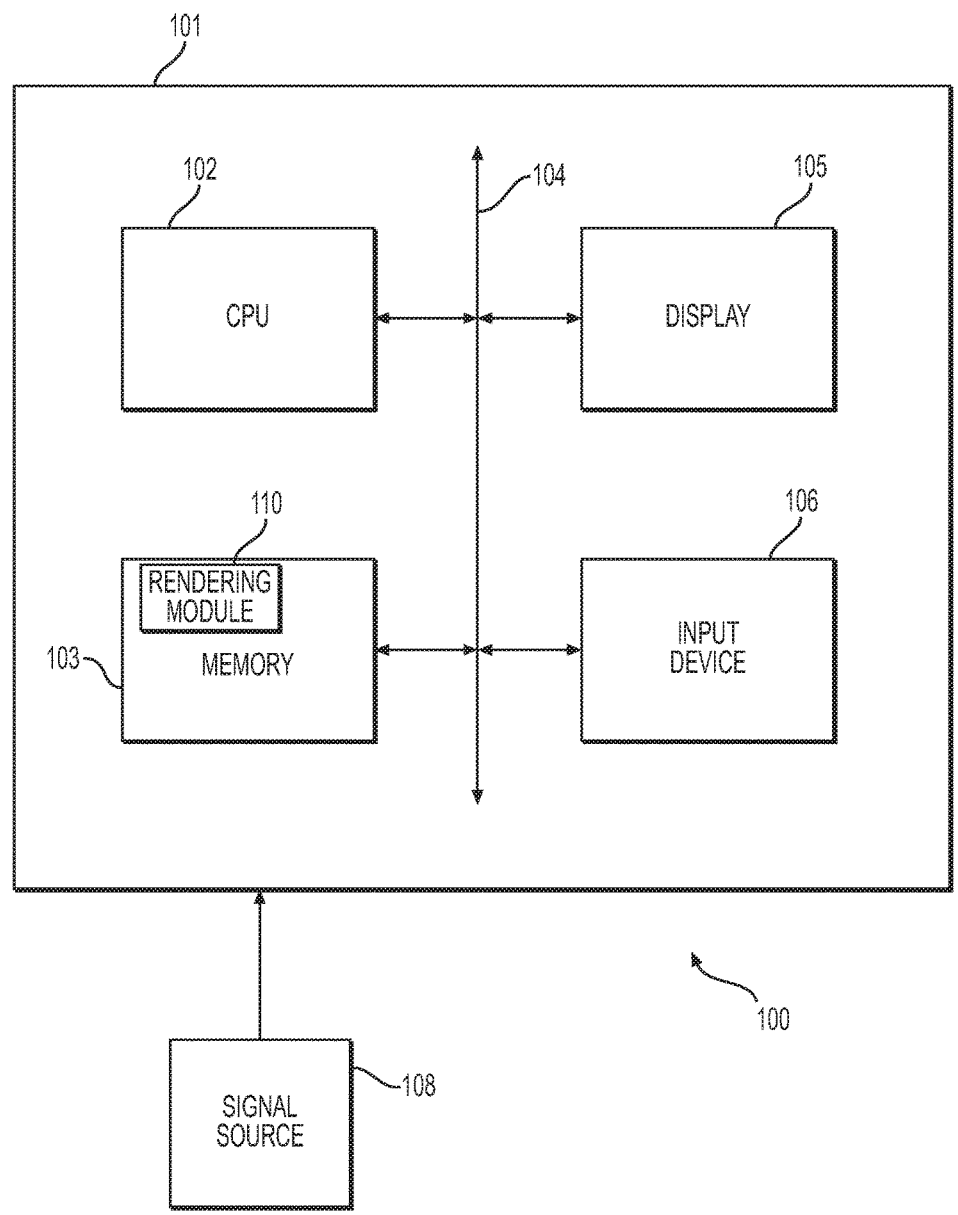

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing elements or control nodes. Such existing hardware may include one or more Central Processing Units (CPUs), system on chips (SoCs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be read only, random access memory, system memory, cache memory, magnetic (e.g., a floppy disk, a hard drive, MRAM), optical media, flash memory, buffer, combinations thereof, or other devices for storing data or video information magnetic (e.g., a floppy disk or a hard drive) or optical (e.g., a compact disk read only memory, or "CD ROM"). Example embodiments are not limited by these aspects of any given implementation.

FIG. 1 illustrates a system for segmented volume rendering according to an example embodiment. A medical imaging system 100 includes a computing system 101 and a signal source 108. The computing system may include a processor 102, a memory 103, a display 105 and input device 106 all coupled to an input/output (I/O) interface 104.

In an example embodiment, the signal source 108 may be a medical imaging device, such as a diagnostic or therapy ultrasound, x-ray, computed tomography, magnetic resonance, positron emission, or other device.

Alternatively, the signal source 108 is part of an archival and/or image processing system, such as a medical records database.

The input device 106 may be a singular device or a plurality of devices including, but not limited to, a keyboard, trackball, mouse, joystick, touch screen, knobs, buttons, sliders, touch pad, and combinations thereof. The input device 106 generates signals in response to user action, such as user pressing of a button.

The input device 106 operates in conjunction with a user interface for context based user input. Based on a display, the user selects with the input device 106 one or more controls, rendering parameters, values, quality metrics, an imaging quality, or other information. For example, the user positions an indicator within a range of available quality levels. In alternative embodiments, the processor 102 selects or otherwise controls without user input (automatically) or with user confirmation or some input (semi-automatically).

The memory 103 is a graphics processing memory, video random access memory, random access memory, system memory, cache memory, hard drive, optical media, magnetic media, flash drive, buffer, combinations thereof, or other devices for storing data or video information. The memory 103 stores one or more datasets representing a three-dimensional volume for segmented rendering.

Any type of data may be used for volume rendering, such as medical image data (e.g., ultrasound, x-ray, computed tomography, magnetic resonance, or positron emission). The rendering is from data distributed in an evenly spaced three-dimensional grid, but may be from data in other formats (e.g., rendering from scan data free of conversion to a Cartesian coordinate format or scan data including data both in a Cartesian coordinate format and acquisition format). The data is voxel data of different volume locations in a volume. The voxels may be the same size and shape within the dataset or the size of such a voxel can be different in each direction (e.g., anisotropic voxels). For example, voxels with different sizes, shapes, or numbers along one dimension as compared to another dimension may be included in a same dataset, such as is associated with anisotropic medical imaging data. The dataset includes an indication of the spatial positions represented by each voxel.

The dataset is provided in real-time with acquisition. For example, the dataset is generated by medical imaging of a patient using the signal source 108. The memory 103 stores the data temporarily for processing. Alternatively, the dataset is stored from a previously performed scan. In other embodiments, the dataset is generated from the memory 103, such as associated with rendering a virtual object or scene. For example, the dataset is an artificial or "phantom" dataset.

The processor 102 is a central processing unit, control processor, application specific integrated circuit, general processor, field programmable gate array, analog circuit, digital circuit, graphics processing unit, graphics chip, graphics accelerator, accelerator card, combinations thereof, or other developed device for volume rendering. The processor 102 is a single device or multiple devices operating in serial, parallel, or separately. The processor 12 may be a main processor of a computer, such as a laptop or desktop computer, may be a processor for handling some tasks in a larger system, such as in an imaging system, or may be a processor designed specifically for rendering. In one embodiment, the processor 102 is, at least in part, a personal computer graphics accelerator card or components, such as manufactured by nVidia®, ATI™, Intel® or Matrox™.

The processor 102 is configured to perform segmented volume rendering as will be described in greater detail below by executing computer-readable instructions stored in the memory 103.

Different platforms may have the same or different processor 102 and associated hardware for segmented volume rendering. Different platforms include different imaging systems, an imaging system and a computer or workstation, or other combinations of different devices. The same or different platforms may implement the same or different algorithms for rendering. For example, an imaging workstation or server implements a more complex rendering algorithm than a personal computer. The algorithm may be more complex by including additional or more computationally expensive rendering parameters.

The processor 102 is operable to volume render a two-dimensional representation of the volume from the dataset by executing the computer-readable instructions stored in the memory 103. The two-dimensional representation represents the volume from a given or selected viewing location using a camera. Volume rendering is used in a general sense of rendering a representation from data representing a volume. The volume rendering includes a defined transfer function such that a color and opacity are assigned to each voxel.

The memory 103 stores a rendering module 110, which includes computer-readable instructions for performing the rendering functions described in herein, such as the methods described with reference to FIGS. 4-5 and 7-8.

The processor 102 may be hardware devices for accelerating volume rendering processes, such as using application programming interfaces for three-dimensional texture mapping. Example APIs include OpenGL and DirectX, but other APIs may be used independent of or with the processor 102. The processor 102 is operable for volume rendering based on the API or an application controlling the API. The processor may also have vector extensions (like AVX2 or AVX512) that allow an increase of the processing speed of the rendering.

The rendering algorithm renders as a function of rendering parameters. Some example rendering parameters include voxel word size, sampling rate (e.g., selecting samples as part of rendering), interpolation function, size of representation, pre/post classification, classification function, sampling variation (e.g., sampling rate being greater or lesser as a function of location), downsizing of volume (e.g., down sampling data prior to rendering), shading, opacity, thresholds, weighting of data or volumes, or any other now known or later developed parameter for rendering. The rendering parameters are associated with two or more options, such as a range of possible fractional or integer values. For example, pre/post classification (classification timing) may be a binary setting providing for mapping luminance to color before or after interpolation. The algorithm may operate with all or any sub-set of rendering parameters. The rendering parameters may be set for a given algorithm, such as a renderer operating only with pre-classification. Other rendering parameters may be selectable by the developer or end-user, such as selecting sampling rate by a developer or selecting shading options by an end-user.

The image is rendered from color and opacity data. Alternatively, the image is rendered from grayscale information. The visibility of volume rendering artifacts may be best shown by color information, grayscale information, or both.

In segmented volume rendering, each segmentation mask can define its own transfer function that is required for volume rendering, which can lead to various kinds of rendering artifacts at segmentation mask boundaries. There are multiple root causes why such artifacts arise at boundaries and why boundary handling is complex. At segmentation mask boundaries, the transfer function may change abruptly, which is not easy to handle efficiently for rendering algorithms that are fundamentally based on discretization. Moreover, at segmentation mask boundaries underlying interpolation operators that are used to interpolate the volume data use input data that partially belong to the mask and partially do not belong to the mask, which leads to artifacts, as will be described below with reference to FIGS. 2-8.

The usage of segmentation masks is not the only kind of segmentation that appears during volume rendering. The transfer function that is assigned to a volume or segmentation mask may also create a segmentation effect, since those values of the transfer function that have zero opacity are segmented out from rendering. Hence, when doing segmented volume rendering, two different kinds of segmentation boundaries occur. One is the boundary of a segmentation mask itself and the other is the boundary surface that is defined implicitly by the transfer function which separates regions that have zero and nonzero opacity.

Figure 2A:
FIGS. 2A and 2B illustrate these two different kinds of boundaries.
Figure 2B:
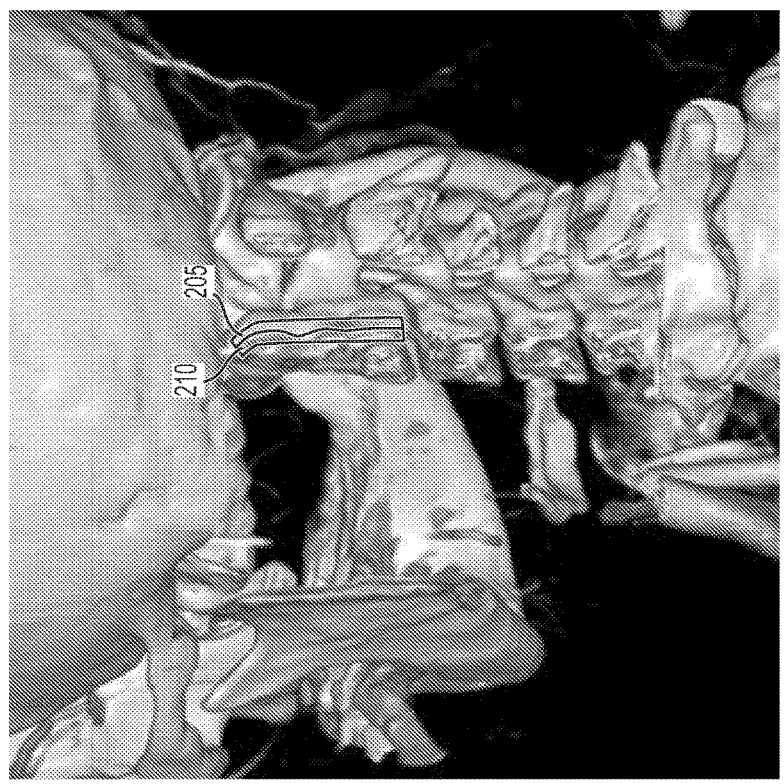

FIGS. 2A and 2B illustrate these two different kinds of boundaries. More specifically, FIG. 2A illustrates an unshaded volume rendering technique (VRT) where a region of the volume is punched out using a binary mask (i.e., a punch mask). FIG. 2B illustrates a shaded VRT where the region is punched out.

In FIGS. 2A-2B, the punch mask is applied on a dataset so that the voxel data within the punch mask is removed from rendering. Moreover, the transfer function that is used creates a boundary 205, in this case the boundary surface of the bones that are visible in the VRT image. The additional punch mask further removes data from the volume, which in this example also creates boundaries 210 that allow looking into the interior structure of the bones.

As shown in FIGS. 2A-2B, the tissue boundary 210 that is caused by the segmentation mask looks very different from the boundary 205 of the dataset that is just implicitly defined by the transfer function. In the shaded VRT case of FIG. 2B, rendering artifacts are visible at the segmentation mask boundaries, since tissue can be made visible that has no clearly defined gradients, which are required for shaded rendering.

It should be understood that boundaries 205 and 210 illustrate just a portion of the transfer function boundary and the segmentation boundary. It should be noted, when comparing images using conventional rendering methods (e.g., FIGS. 2A-2B and 6A-6B) to images that use example embodiments (e.g., FIGS. 3A-3B and 6C), the image parts that are the same in both images (using conventional rendering methods and a corresponding image using example embodiments) illustrate parts that have been created by the transfer function, while those image parts that have changed are a result from the mask boundary.

Example embodiments are directed to algorithms that reduce this problem. More specifically, segmented volumes are rendered so that the boundaries of the segmentation masks become less visible.

Figure 3A:
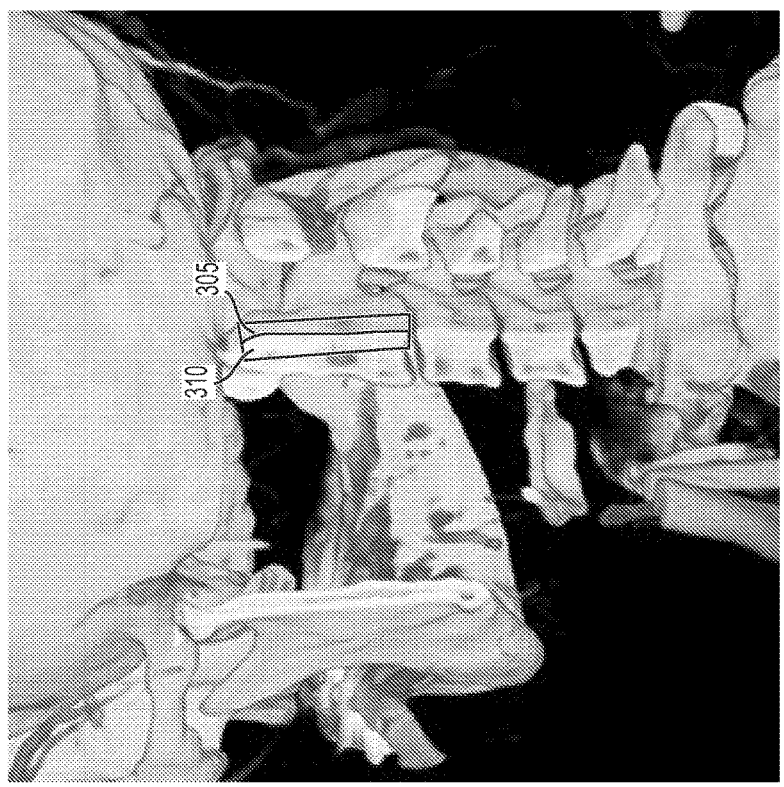
FIGS. 3A-3B illustrate unshaded and shaded volume rendering technique (VRT) images, respectively, according to an example embodiment.
Figure 3B:
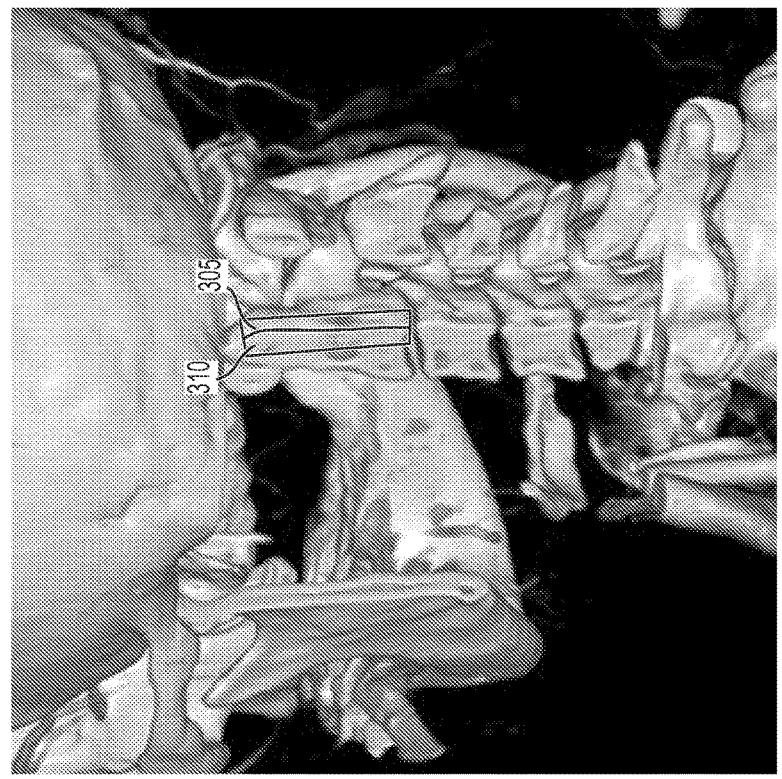

For example, FIGS. 3A-3B illustrate unshaded and shaded VRT images, respectively, according to an example embodiment. FIGS. 3A-3B use the same dataset as FIGS. 2A-2B. When FIGS. 3A-3B are compared to FIGS. 2A-2B, respectively, the shades at a mask boundary 310 (representing color) are more similar to a transfer function boundary 305 of the data set in FIGS. 3A-3B.

In the shaded VRT scenario the gradient artifacts have been reduced/vanished at the mask boundary and the mask boundary becomes more similar to the boundaries that are created by the transfer function.

While some example embodiments are discussed with reference to mask boundaries for punch masks, it should be understood that example embodiments may be implemented for other mask boundaries (e.g., show masks).

One possible implementation of the case where, a punch mask is applied on a volume, would be to create a modified duplicated dataset, where the punch mask is burned into a volume copy. For unsigned datasets this means that the value "zero" is written into the volume copy at those voxels where the punch operation is to be applied. For a general dataset case where the volume can also be signed data, a smallest possible voxel value may be burned into the volume copy. This approach naturally allows handling the boundary of the punch mask similar to the boundary that results from the transfer function segmentation, since the punch mask no longer exists as a mask but has become part of the volume. However, this method requires duplicating the volume, which substantially increases the memory consumption compared to the punch mask alone. Burning in the mask into the volume is a relatively expensive operation if the volume is large (i.e., not well suited in dynamic scenarios where the mask results from an interactive operation). Moreover, this approach can create "Phantom Surfaces", which means it can create surfaces in the result image that are in reality not present when using a regular segmented volume rendering approach.

Figure 4:
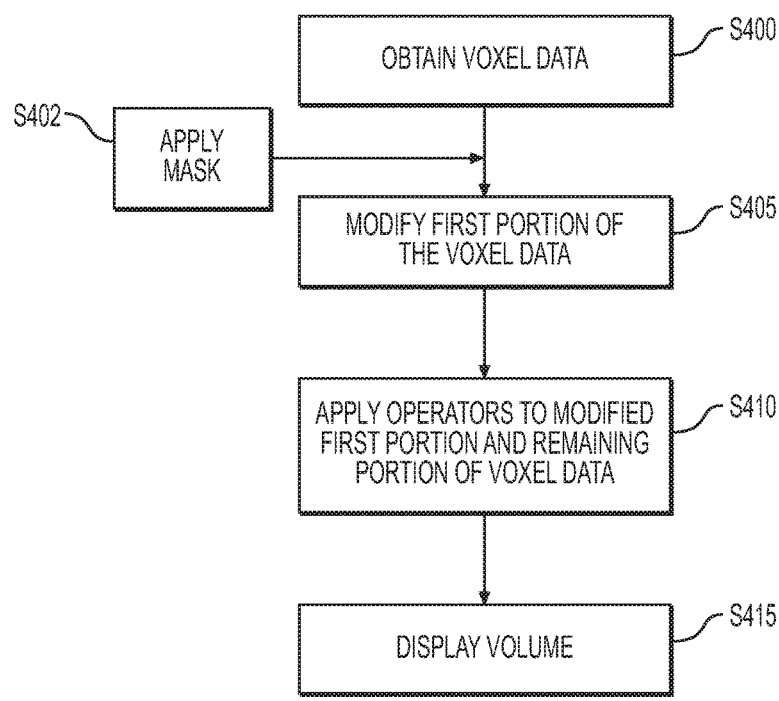

FIG. 4 illustrates a method of segmented volume rendering according to an example embodiment. The method of FIG. 4 may be performed by the system 100, shown in FIG. 1.

At S400, a processor (e.g., the processor 102) obtains voxel data from a medical imaging device, a memory or a database, for example. The voxel data includes an indication of the spatial positions represented by each voxel.

At S402, the processor receives an input regarding which segmentation mask or masks to implement.

At S405, the processor dynamically modifies a first portion of the voxel data. The first portion of the voxel data is associated with voxels that are part of the segmentation mask. By performing the modification dynamically (i.e., on the fly), memory is saved and preprocessing requirements are reduced, which permits handling dynamically modified segmentation mask use cases.

More specifically, the modification is performed by the processor dynamically when doing an interpolation operation on the voxel data, such as trilinear interpolation. Such an interpolation operation uses voxel input data. For example, trilinear interpolation uses 8 voxels around a point as input. As will be described below, at least one of the 8 voxel values may be modified if the voxel value belongs to a segmentation mask (including the boundary). Other examples of interpolation operators include triquadratic and tricubic interpolation.

The processor may sample the 8 voxels using a binary mask to determine whether any of the voxels belongs to a segmentation mask, including the boundary of the segmentation mask. If at least one of the 8 voxels belongs to the segmentation mask and at least one voxel does not belong to the mask, the processor recognizes the 8 voxels are in a boundary case.

The processor may determine whether a voxel belongs to the segmentation mask using a binary mask. If a voxel is determined by the processor to belong to a segmentation mask, the value of the voxel is modified as described in further detail below. The processor then performs trilinear interpolation using 8 voxel values that include the modified voxel values and/or original voxel values (a voxel value of an unmodified voxel retains its original voxel value as input for the interpolation). The same interpolation operator is used by the processor regardless of whether the voxel value has been modified.

The discussion immediately below will discuss example embodiments with respect to a segmentation mask A that is a punch mask, but as will also be described, example embodiments may be implemented with a show mask. As stated above, in the punch mask, a transfer function attached to the punch mask is empty (zero). By contrast, a transfer function attached to the show mask is not empty.

When adding the segmentation mask A with the empty transfer function attached to it, all voxels that belong to this mask are treated as 100% transparent. The voxels that belong to the segmentation mask A are determined dynamically during the interpolation process as described above.

During segmented volume rendering, the processor solves a volume rendering integral along a ray, which is done by sampling the voxels at positions along the ray. At those sampled positions, two kinds of interpolations are performed by the processor in a case of shaded volume rendering: the processor (1) interpolates the discrete voxels of the voxel data that are along the ray using a sampling operator (a volume interpolation operator) and (2) the processor determines a gradient from the interpolated discrete voxel data with a gradient operator.

The sampling operator may be a polynomial interpolator, for example, trilinear or tricubic interpolation. However, example embodiments are not limited thereto.

The gradient operator may be a central difference or a Sobel operator. However, example embodiments are not limited thereto. All operators have in common is that discrete voxel data is used as the input.

The voxel data includes discrete volume data with voxels $V_{ijk}$. T is a general interpolation operator where $T_V$ is a volume interpolation operator and $T_G$ is a gradient operator. A mask aware operator $T(A,w)$ for a punch mask A is defined as an operator used by the processor that applies T on voxel input data $\hat{V}_{ijk}$, where the processor may modify a portion of the voxel data as:

$$\hat{V}_{ijk} = w; V_{ijk} \in A$$

$$\hat{V}_{ijk} = V_{ijk}; V_{ijk} \notin A \quad (1)$$

where i, j and k are voxel indices (volume indices) and w is a degree of freedom value.

In other words, when a voxel belongs to the mask A, the voxel data associated with the voxel is set by the processor to the value w. If the voxel does not belong to the mask A, the processor does not change the voxel data associated with the voxel. It should be understood that only the voxel data used for interpolation is modified, not the volume itself.

The transfer function of the punch mask A has an opacity term a(x). Thus, for a voxel value w that is associated with the punch mask A, the opacity is a(w).

However, the processor may implement a more restrictive condition than just requiring that a(w) is zero, where $$a(x) = 0 \forall x \leq w \quad (2)$$

Condition (2) guaranties that voxels that have a non-zero opacity have to be larger than w. This creates a situation where a ray that starts inside the mask and leaves the mask will start with interpolated voxel values w and will then increase to voxel values larger than w.

From all possible values of w that satisfy equation (2), the processor determines a solution $w_{opt}$ within that set of values w that produces an improved and/or optimal natural boundary image quality. When analyzing the image quality for many test datasets and transfer functions, the inventors found that the optimal value $w_{opt}$ should be defined as the largest one within the set of possible values w, which is formulated as $$W = \{w | a(x) = 0 \forall x \leq w\}$$

$$w_{opt} = \max(W) \quad (3)$$

All values less than or equal to w have an associated opacity of zero from the transfer function.

The transfer function defines the opacity and $w_{opt}$ is the upper boundary of voxel values that have an associated opacity of zero, with the additional constraint that also all smaller voxel values than $w_{opt}$ have an opacity of zero. Therefore, the processor determines which voxels have opacity of zero for itself and for all smaller voxels values and then chooses a maximum value of that set. For example, if all voxel values 0-100 give an opacity value of zero and the voxel value 101 gives an opacity greater than zero, the processor sets $w_{opt}$ to be 100.

In another example, when voxel values belonging to the punch mask A have voxel values 0-100 that give an opacity of zero, 101-200 give an opacity greater than non-zero and 201-300 give an opacity of zero, the processor sets $w_{opt}$ to be 100 because setting $w_{opt}$ to 300 would violate condition (2).

Therefore, at S405, the processor modifies the portion of voxel data associated with the punch mask A by replacing the voxel values of the voxels associated with the punch mask A to be $w_{opt}$. Thus, the processor sets a portion of the voxel data to be a value as set forth below:

$$\hat{V}_{ijk} = w_{opt}; V_{ijk} \in A$$

$$\hat{V}_{ijk} = V_{ijk}; V_{ijk} \notin A \quad (4)$$

At S410, the processor applies the volume interpolation operator $T_V$ and the gradient operator $T_G$ to the modified portion of the voxel input data $\hat{V}_{ijk}$ as well as the remaining portion of the voxel input data $\hat{V}_{ijk}$. In the case of a single mask being present, the remaining portion of the voxel data may be voxel values of voxels in a region of interest that are not associated with the mask A.

More specifically, using the volume interpolation operator $T_V$ and the gradient operator $T_G$, the operators $T_V(A, w_{opt})$ and $T_G(A, w_{opt})$ operate on the modified voxel input data $\hat{V}_{ijk}$ (voxel data changed to $w_{opt}$) as defined in equation (1) where $w_{opt}$ is specified by equation (3).

Once the processor applies the volume interpolation operator $T_V$ and the gradient operator $T_G$ at S410, the processor uses the volume interpolation operator $T_V$ and the gradient operator $T_G$ for volume rendering and displays the volume on a display at S415 using known methods. For example, once the modified volume and modified gradient operators are applied, the remaining part of the volume rendering uses known methods such as described in (1) Drebin, Robert A.; Carpenter, Loren; Hanrahan, Pat (1988), "Proceedings of the 15th annual conference on Computer graphics and interactive techniques—SIGGRAPH '88", ACM Press, pp. 65-74, the entire contents of which are incorporated by reference, and (2) ENGEL K., KRAUS M., ERTL T.: High quality pre-integrated volume rendering using hardware accelerated pixel shading. In Proceedings Graphics Hardware 2001 (2001), Mark W., Schilling A., (Eds.), ACM Press, pp. 9-16, the entire contents of which are incorporated by reference.

Figure 5:
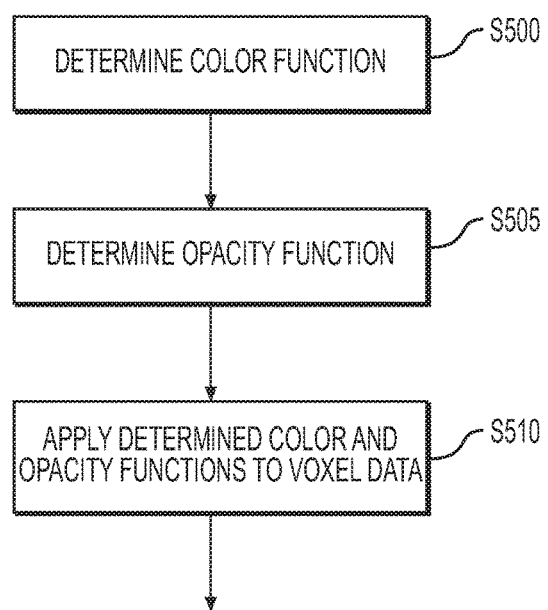

FIG. 5 illustrates an example embodiment of a portion of applying the operators shown in FIG. 4. The method of FIG. 5 reduces phantom surfaces in an image.

In the method of FIG. 5, r(s) is a 3 dimensional ray in arc length parameterization and is a sampled ray for volume rendering. In FIG. 5, the operator T interpolates the voxel values. The transfer function includes an initial color function c(x) and an initial scalar opacity function a(x). The color function c(x) and the opacity function a(x) for a ray can be described as c(T(r(s))) and a(T(r(s))), respectively.

To make the formulations in the following easier, c(s) and a(s) may be used to describe the initial color function c(T(r(s))) and the initial opacity function a(T(r(s)), respectively, for the color and opacity scalar functions that arise for a given ray and interpolation operator.

At S500 and S505, the processor determines a color function and an opacity function, respectively. While S500 is illustrated as occurring before S505, it should be understood that the ordered of executing S500 and S505 may be reversed or they may be performed simultaneously.

More specifically, the initial color function c(s) and the initial opacity function a(s) are the color and opacity functions along a ray that are defined by the unmodified original volume rendering algorithm using operator T (that is without a portion of the voxel data being modified to $w_{opt}$), where the mask A is not taken into account.

A modified color function c'(s) and a modified opacity function a'(s) are defined by the rendering algorithm that applies the boundary modification operators $T(A, w_{opt})$ for a punch mask A.

The modified color function c'(s) and the modified opacity function a'(s) along the ray are combined into determined color and opacity functions that are defined as ĉ(s) and â(s) using the definition:

$$\hat{c}(s)=c'(s), \hat{a}(s)=a'(s); a(s) > a'(s)$$

$$\hat{c}(s)=c(s), \hat{a}(s)=a(s); a(s) \leq a'(s) \quad (5)$$

Therefore, the processor determines the opacity function â(s) and color function ĉ(s) to use in accordance with equation (5).

In other words, the combined color function ĉ(s) and opacity function â(s) determined by the processor is equal to the initial color function c(s) and opacity function a(s) (where the mask A is not taken into account) whenever the modified opacity of the modified algorithm a'(s) is larger or equal than the initial opacity of the original algorithm a(s) (i.e., a(s)≤a'(s)) and is equal to the modified color function c'(s) and the modified opacity function a'(s) when the initial opacity of the original algorithm a(s) is greater than the modified opacity of the modified algorithm a'(s) (i.e., a(s)>a'(s)). The term "modified algorithm" may refer to a transfer function where the voxel value is modified in accordance with equation (3), as described above with reference to S400 (i.e., replacing the voxel value in the obtained voxel data with $w_{opt}$ where applicable).

The initial color and opacity functions for c(s) and a(s) are used by the processor so that the punch mask A is not taken into account, since if the punch mask A would be taken into account, the region where the punch mask is applied would by definition have zero opacity everywhere inside the punch mask, while the modified algorithm can be nonzero when being very close to the mask boundary.

Since the determined opacity â(s) is never larger than the opacity of the initial opacity function a(s) applied on the volume, the method of FIG. 5 avoids "phantom surfaces", since such surfaces would have a larger opacity at the boundary than the original rendering algorithm had.

Figure 6A:
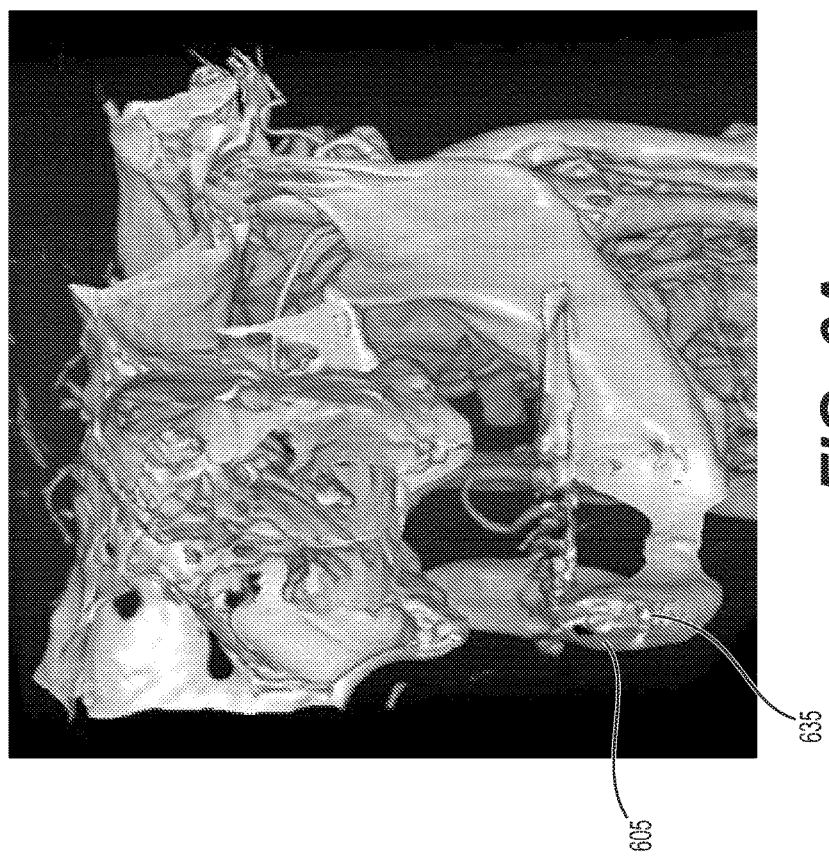
FIG. 6A illustrates a shaded VRT image where some parts of a volume have been punched away.
Figure 6B:
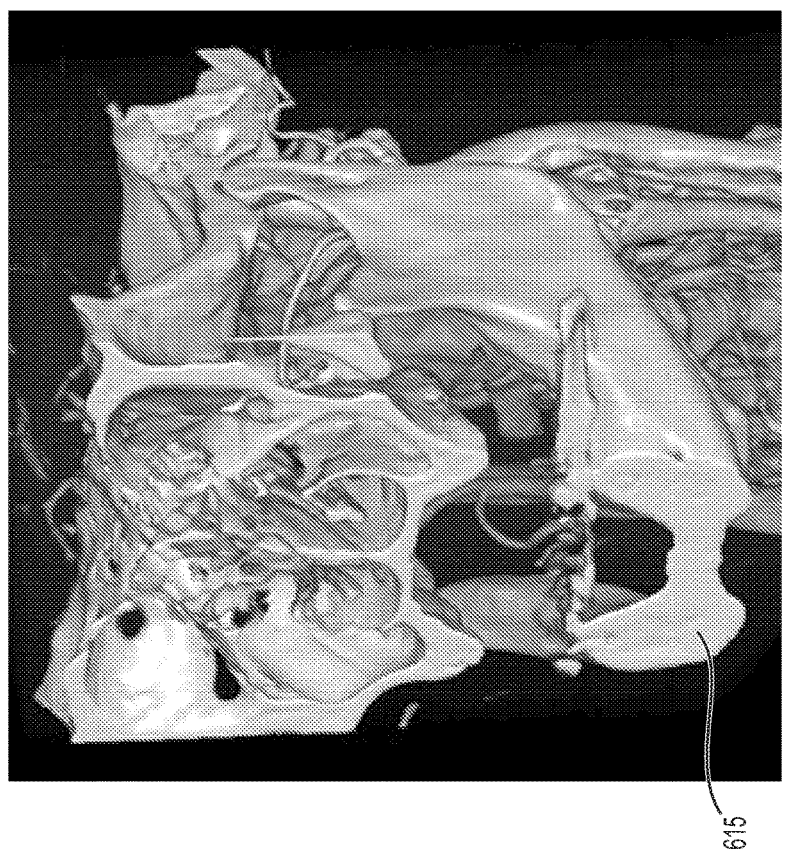
FIG. 6B illustrates an image where the method of FIG. 5 is not applied to the shaded VRT image of FIG. 6A.

FIG. 6A illustrates a shaded VRT image where some parts of a volume have been punched away. FIG. 6B illustrates an image where the method of FIG. 5 is not applied to the shaded VRT image of FIG. 6A and only the initial color function c(s) and opacity function a(s) are used and FIG. 6C illustrates an image where the method of FIG. 5 is applied to the shaded VRT image of FIG. 6A.

In FIG. 6A, the transfer function is transparent in the lowest regions of the grayscale value range and also has transparent regions in higher ranges. These transparencies in higher regions cause bones to become hollow inside as shown in area 605. As a result, an inside of bones at the mask boundaries of the punch mask is visible. However, by modifying some data (e.g., a burn in the punch mask into the volume with the smallest voxel value) and not implementing the method of FIG. 5, a phantom surface 615 may be created, as shown in FIG. 6B. Due to the phantom surface 615, the inside of the bones is no longer visible, since the boundary of the mask was covered with a fully opaque surface. The phantom surface 615 is caused by pulling the interpolated voxel values of the voxel data near the boundary of the punch mask A too far towards smaller values so that the lower opaque parts of the transfer function are reached.

Figure 6C:
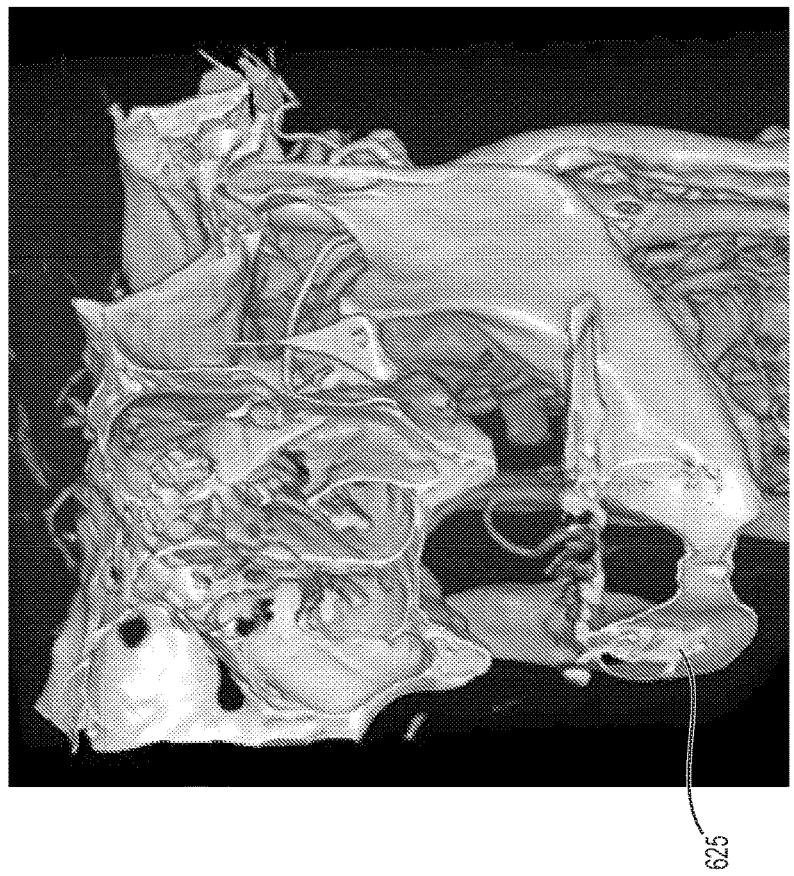
FIG. 6C illustrates an image where the method of FIG. 5 is applied to the shaded VRT image of FIG. 6A.

FIG. 6C illustrates an example embodiment of modifying voxel data in accordance with the method of FIG. 5. As shown in FIG. 6C, the phantom surface 615 does not exist and the bones appear hollow, permitting the inside of the bones to be visible. Moreover, FIG. 6C has a reduced amount of artifacts when compared to FIG. 6A, as can be seen in area 625 of FIG. 6C (compared to area 635 of FIG. 6A).

At least one example embodiment provides volume rendering that implements preintegrated volume rendering.

The color and opacity functions along a ray are defined by dividing the ray into small intervals and fetching into a preintegration table for each interval $[s_a, s_{a+1}]$. The preintegration table may be stored in the memory 103. The processor fetches a color value and an opacity value from the preintegration table using the interpolation voxel value at a start $T(r(s_a))$ and at an end of the interval $T(r(s_{a+i}))$. Generation of the preintegration table may be performed as described in ENGEL K., KRAUS M., ERTL T.: High quality pre-integrated volume rendering using hardware accelerated pixel shading. In Proceedings Graphics Hardware 2001 (2001), Mark W., Schilling A., (Eds.), ACM Press, pp. 9-16, the entire contents of which are hereby incorporated by reference.

For each interval, the processor decides whether to use the original interpolation values $T(r(s_a))$ and $T(r(s_{a+1}))$ of the interpolation operator T (i.e., using voxel values from the obtained voxel data) fetched from the preintegration table or modified interpolation values that are a result of the modified interpolation operator $T(A, w_{opt})$ (i.e., modifying voxel values from the obtained voxel data to be $w_{opt}$) fetched from the preintegration table.

The term $a^p(x_m, x_n)$ is the opacity that the processor retrieves from the preintegration table when the processor performs a fetch into the preintegration table for an interval $[x_m, x_n]$ with voxel values $x_m$ and $x_n$ for an underlying sampling distance.

The processor uses the values of the modified interpolation operator $T(A, w_{opt})$ fetched from the table, whenever the opacity of the fetched value is smaller than that resulting from the original interpolation values. Otherwise, the processor uses the initial interpolated values fetched from the preintegration table. Again, in the initial interpolated value case, the mask A is not taken into account.

Therefore, color and opacity values may be fetched from the preintegration table instead of using equation (4).

In example embodiments, the modified opacity value and initial opacity value may be fetched from the preintegration table and then the processor fetches the color value corresponding to the opacity value to be used. In other example embodiments, the processor may fetch the modified color value and the initial color value when fetching the corresponding modified opacity value and the corresponding initial color value, respectively.

In example embodiments where a preintegration table is used by the processor, the processor may also use quantification such that different voxel values close to each other can lead to a same fetched value in the preintegration table. When using quantification, the processor may modify $w_{opt}$ and the set Was defined in equation (3).

$$W^p = \{w' | \alpha^p(x,x) = 0 \forall x \le w'\}$$

$$w'_{opt} = \max(W^p) \qquad (6)$$

where the usage of "'" refers to example embodiments where quantification is implemented by the processor.

When the fetched interpolation values are partially inside and partially outside of the punch mask A, the processor uses the interpolation operator $T(A,w_{opt})$ for the voxel values at the boundary. In all other instances, the interpolation is either identical to that of the initial interpolation operator T or belongs completely to the punch mask A and the result is known to be $w_{opt}$ in advance. Thus, the computations using the interpolation operator $T(A,w_{opt})$ for voxels outside the boundary may be skipped as a performance optimization. For example, the processor may use a binary optimization mask for volume interpolation and a binary optimization mask for gradient interpolation. For a given position inside the volume, a binary value is fetched from the binary optimization mask to decide if it is a boundary case where the interpolation operator $T(A,w_{opt})$ is used. This allows optimizing the performance, since the interpolation operators $T(A,w_{opt})$ are more expensive to compute than the regular unmodified operators.

For example, in trilinear interpolation, the processor may sample 8 voxels using a binary mask to determine whether any of the voxels belongs to a segmentation mask. If at least one of the 8 voxels belongs to the segmentation mask and at least one voxel does not belong to the mask, the processor recognizes the 8 voxels are in a boundary case. This information can be stored in a binary optimization mask that stores a Boolean value for each combination of 8 voxels that are possible as input for the interpolation operator. The Boolean value indicates whether the combination of 8 voxels is in a boundary case or not. During rendering, this optimization structure allows to detect if all 8 voxels belong to a boundary or not.

Thus, the processor uses the interpolation operator $T(A, w_{opt})$ on the voxel(s) that is/are determined to be part of the mask and the initial interpolation operator T on the remaining voxel(s) determined not to belong to the mask. When the processor samples the 8 voxels and all voxels are determined to do not belong to the mask, the processor does not recognize the 8 voxels as being at a boundary and, therefore, applies the initial interpolation operator T. When the processor samples the 8 voxels and all voxels are determined to belong to the mask, the processor does not have to perform an interpolation operation since the result will be $w_{opt}$. This optimization is not necessary, but allows reduction of the computational requirements.

While example embodiments are described with reference to a case where a single show mask is present where a single punch mask is being applied, example embodiments are not limited thereto. There may be multiple overlapping show masks that are applied on a volume, where each mask defines a region that has its own transfer function. Also in this multi show mask case we can apply a punch mask.

Within each region that has its own transfer function, the processor uses different operators for volume and gradient interpolation, since the $w_{opt}$ value for the operators depends on the transfer function of the region.

A ray r(s) in a multiple show mask scenario is decomposed into intervals, where each interval belongs to one of the show masks. Each interval is then handled by the processor in accordance with the methods described with reference to FIGS. 4-5 (i.e., one mask at a time). The intervals may then be combined using known methods such as described in Röttger, Stefan; Guthe, Stefan; Weiskopf, Daniel; Ertl, Thomas; Straßer, Wolfgang, Smart Hardware-Accelerated Volume Rendering, Proceedings of EG/IEEE TCVG Symposium on Visualization VisSym '03, S. 231-238, 2003, the entire contents of which are incorporated by reference. This reduces the case where a punch mask is applied to the case multiple show masks are present (i.e. a transfer function that is not completely empty) to the already described case of a boundary handling between a single show mask and a punch mask. A show mask is a mask with a transfer function that is not completely empty (zero opacity) everywhere.

Figure 7:
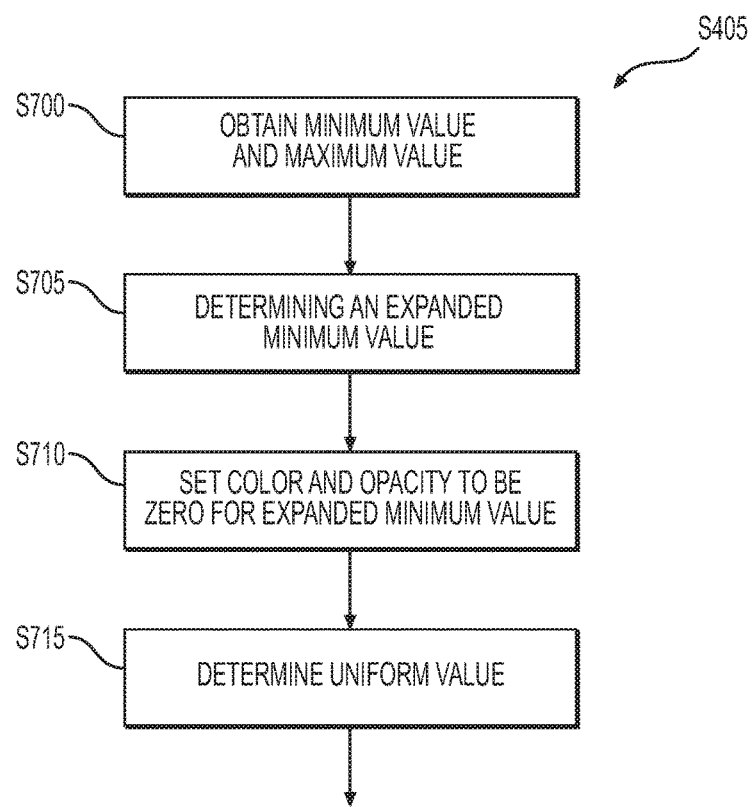

FIG. 7 illustrates an example embodiment of modifying a first portion of the voxel data (S405) where a show mask has an opacity function such that a set of possible values that is used to determine $w_{opt}$ is empty.

There are special cases of show masks, where the transfer function of the mask is not zero for the smallest possible value of the transfer function. An important example that often occurs in a real world scenario is the case where the transfer function is constant, with a constant opacity that is not zero everywhere. In such cases the set of possible values that is used to determine $w_{opt}$ is empty. For such cases, example embodiments described above are modified as described below with reference to FIG. 7.

At S700, the processor obtains a minimum value $v_{min}$ of the voxel data and a maximum value $v_{max}$ of the voxel data. In other words, a volume is permitted to have voxel values that lie between $v_{min}$ and $v_{max}$. As a result, the transfer function for the volume is defined for the interval [$v_{min}$, $v_{min}$]. More specifically, the set of all voxel values form a set (histogram) and this set has a smallest value $v_{min}$ and a largest value $v_{max}$.

If set W that is defined in equation (3) is empty, which is for example the case when the transfer function is constant, with a constant opacity that is not zero everywhere, equation (3) may not be used by the processor to determine the value $w_{opt}$.

Therefore, the processor determines an expanded range of the volume data at S705. More specifically, the processor determines an expanded minimum value $v_{min}-1$. As a result, the processor expands a defined range of the volume data to be the range [$v_{min}-1, v_{max}$].

At S710, the processor expands the range on which the transfer function is defined such that the color and opacity for the voxel value $v_{min}-1$ are set to zero.

At S715, the processor then determines the value $w_{opt}$ using equation below.

$$w_{opt} = v_{min} - 1 \qquad (7)$$

Practically this approach requires a modification of the operators for volume and gradient interpolation, since they now have to be able to cope with the extended voxel range for input and output. More specifically, if an interpolated value is smaller than $v_{min}$, the processor sets the color and the opacity to zero either programmatically or by using a color/opacity table that accepts such values without causing an access violation.

For example, when a processor determines interpolated values smaller than $v_{min}$, the processor may not fetch color and opacity values, but be programmed to set the associated color and opacity values of the interpolated values smaller than $v_{min}$ to zero. Alternatively, the processor may use a table that allows for values smaller than $v_{min}$.

Since typically the voxel range for unsigned and signed datasets is not larger than 16 bits and the fetched voxel values are internally handled as either Int32 or Float32 values, this range extension can then still be handled using Int32 or Float32 values, making it easier to integrate the proposed change efficiently into an existing rendering algorithm.

Figure 8:
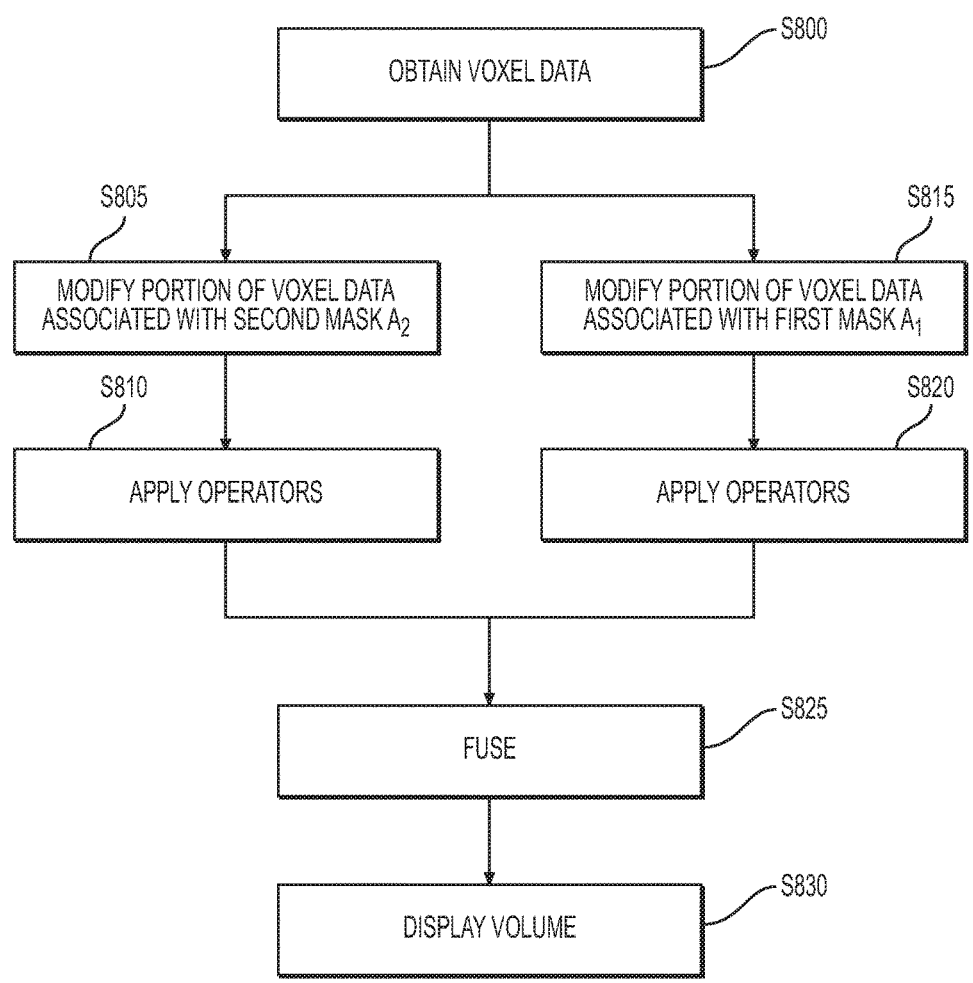

FIG. 8 illustrates an example embodiment of volume rendering in which a boundary is defined between two show masks $A_1$ and $A_2$ that have non-zero transfer functions. In examples where multiple show masks $A_1$ and $A_2$ are used, a boundary may be defined to be a region between the masks. For example, a boundary may be defined to be a region between two show masks that have different transfer functions that both are non-empty.

More specifically, creating boundaries between two masks that have non-zero transfer functions can be computed by decomposing it into two cases (1) the first mask $A_1$ is treated as a show mask (using its non-empty transfer function) and the second mask $A_2$ is treated as a punch mask (having an empty transfer function), and (2) the first mask $A_1$ is treated as a punch mask (having an empty transfer function) and the second mask $A_2$ is treated as a show mask (using its non-empty transfer function).

In FIG. 8, the processor obtains voxel data at S800.

At S805 and S810, the processor treats the first mask $A_1$ as a show mask (non-empty transfer function) and the second mask $A_2$ as a punch mask (empty transfer function). More specifically, the processor performs the method described in FIG. 4 using the second mask $A_2$ as the punch mask and the transfer function of the first mask $A_1$. Thus, steps S805 and S810 are performed in the same manner as S405 and S410.

It should be noted that at S805, a value $w_{opt1}$ is determined using equation (3) since $w_{opt1}$ depends on the transfer function of the show mask, the first mask $A_1$ is treated as the show mask and the second mask $A_2$ is treated as the punch mask.

At S805, the processor modifies at least a portion of voxel data associated with the second mask $A_2$ by replacing the voxel values of the voxels associated with the second mask $A_2$ to be $w_{opt1}$. Thus, the processor sets a portion of the voxel data to be a value as set forth below:

$$\hat{V}_{ijk1} = w_{opt1}; V_{ijk} \in A_2$$

$$\hat{V}_{ijk1} = V_{ijk}; V_{ijk} \notin A_2 \quad (8)$$

At S810, the processor applies the volume interpolation operator $T_V$ and the gradient operator $T_G$ to the modified portion of the voxel input data $\hat{V}_{ijk1}$ as well as the remaining portion of the voxel input data $\hat{V}_{ijk1}$.

More specifically, using the volume interpolation operator $T_V$ and the gradient operator $T_G$, the operators $T_V(A, w_{opt1})$ and $T_G(A, w_{opt1})$ operate on the modified voxel input data $\hat{V}_{ijk1}$ (voxel data changed to $w_{opt1}$) as defined in equation (1) where $w_{opt1}$ is specified by equation (3) (using the second mask $A_2$ as the punch mask and the transfer function of the first mask $A_1$).

At S815 and S820, the processor treats the second mask $A_2$ as a show mask (non-empty transfer function) and the first mask $A_1$ as a punch mask (empty transfer function). More specifically, the processor performs the method described in FIG. 4 using the first mask $A_1$ as the punch mask. Thus, steps S815 and S820 are performed in the same manner as S405 and S410. It should be noted that at S815, a value $w_{opt2}$ is determined using equation (3) since $w_{opt2}$ depends on the transfer function of the show mask, the second mask $A_2$ is treated as the show mask and the first mask $A_1$ is treated as the punch mask.

At S815, the processor modifies at least a portion of voxel data associated with the first mask $A_1$ by replacing the voxel values of the voxels associated with the first mask $A_1$ to be $w_{opt2}$. Thus, the processor sets a portion of the voxel data to be a value as set forth below:

$$\hat{V}_{ijk2} = w_{opt2}; V_{ijk} \in A_1$$

$$\hat{V}_{ijk2} = V_{ijk}; V_{ijk} \notin A_1 \quad (9)$$

At S820, the processor applies the volume interpolation operator $T_V$ and the gradient operator $T_G$ to the modified portion of the voxel input data $\hat{V}_{ijk2}$ as well as the remaining portion of the voxel input data $\hat{V}_{ijk2}$.

More specifically, using the volume interpolation operator $T_V$ and the gradient operator $T_G$, the operators $T_V(A, w_{opt2})$ and $T_G(A, w_{opt2})$ operate on the modified voxel input data $\hat{V}_{ijk2}$ (voxel data changed to $w_{opt2}$) as defined in equation (1) where $w_{opt2}$ is specified by equation (3) (using the first mask $A_1$ as the punch mask and the transfer function of the second mask $A_2$).

While S805-S810 and S815-S820 are illustrated as being performed in parallel, example embodiments are not limited thereto.

At S825, the processor combines the resulting two color and opacity functions along the ray using the same formulas that are used for handling volume rendering of two volumes, where each volume has its own transfer function. The combining may be performed by using fused volume rendering algorithms such as those described in F. Roessler, E. Tejada, T. Fangmeier, T. Ertl, GPU-based Multi-Volume Rendering for the Visualization of Functional Brain Images, Proceedings of SimVis, 315-318, 2006, the entire contents of which are hereby incorporated by reference.

At S830, the processor then displays the fused volume.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A method for visualizing using a rendering technique in which voxels are sampled along a ray through a volume, the method comprising:
    obtaining voxel data;
    modifying a first portion of the voxel data, the first portion of the voxel data associated with a first segmentation mask, the modifying including,
        setting the first portion of the voxel data to a uniform value, the uniform value being within a plurality of permitted voxel values, the setting including,
            determining the plurality of permitted voxel values, and
            determining the uniform value as the largest value within the plurality of permitted voxel values;
    applying a set of operators to the modified first portion of the voxel data and a remaining portion of the voxel data; and
    displaying the volume based on the applied set of operators.

2. The method of claim 1, wherein an opacity function generates an opacity of zero for all voxel values in the plurality of permitted voxel values such that for each element of the plurality of permitted voxel values the opacity is zero and an opacity for all values smaller than the element are also zero.

3. The method of claim 1, wherein the applying includes,
   determining a color function of the ray among an initial color function and a modified color function, the modified color function associated with the uniform value;
   determining an opacity function of the ray among an initial opacity function and a modified opacity function, the modified opacity function associated with the uniform value,
      the determined color function being the modified color function when an opacity at an arc length is less using the modified opacity function than an opacity at the arc length using the initial opacity function,
      the determined opacity function being the modified opacity function when the opacity at the arc length is less using the modified opacity function than the opacity at the arc length using the initial opacity function; and
   applying the determined color function and the determined opacity function to the voxel data.

4. The method of claim 3, wherein the determined color function represents color values over intervals of the ray, respectively, and the determined opacity function represents opacity values over the intervals, respectively, of the ray.

5. The method of claim 3, wherein the determining the color function includes,
   obtaining the color values and the opacity values from a preintegration table.

6. The method of claim 5, wherein $$W^p = \{w | a^p(x,x) = 0 \forall x \leq w\};$$

$$w_{opt} = \max(W^p)$$

where x is a voxel value, $a^p(x,x)$ is an opacity value in the preintegration table where a start and an end of an interval is associated with the voxel value and $w_{opt}$ is the uniform value.

7. The method of claim 1, further comprising:
   determining a boundary using a binary optimization mask.

8. The method of claim 1, further comprising:
   second modifying a second portion of the voxel data, the second portion of the voxel data associated with a second segmentation mask, the second modifying including,
      setting the second portion of the voxel data to a second uniform value; and
   applying the set of operators to the modified second portion of the voxel data and the first portion of the voxel data, wherein the displaying displays the volume based on the applied set of operators to the modified first portion of the voxel data and the applied set of operators to the modified second portion of the voxel data.

9. The method of claim 8, wherein the setting the second portion of the voxel data includes,
   determining a set of permitted values for the second uniform value; and
   determining the second uniform value as the largest value within the set of permitted values.

10. The method of claim 1, wherein the at least one of the plurality of permitted voxel values is an optimized value.

11. The method of claim 1, wherein the first segmentation mask is a first show mask, the method further comprising:
   modifying a second portion of the voxel data, the second portion of the voxel data associated with a second show mask, the modifying including,
      setting the second portion of the voxel data to at least one of a second plurality of permitted voxel values;
   applying the set of operators to the modified second portion of the voxel data and the voxel data excluding the modified second portion; and
   displaying the volume based on the applied set of operators.

12. A system for visualizing a volume, the system comprising:
   a memory storing computer-readable instructions; and
   at least one processor configured to execute the computer-readable instructions to cause the system to,
      obtain voxel data,
      modify a first portion of the voxel data, the first portion of the voxel data associated with a first segmentation mask, by
         setting the first portion of the voxel data to a uniform value, the uniform value being within a plurality of permitted voxel values, by
         determining the plurality of permitted voxel values, and
         determining the uniform value as the largest value within the plurality of permitted voxel values,
      apply a set of operators to the modified first portion of the voxel data and a remaining portion of the voxel data, and
      display the volume based on the applied set of operators.

13. The system of claim 12, wherein an opacity function generates an opacity of zero for all voxel values in the plurality of permitted voxel values such that for each element of the plurality of permitted voxel values the opacity is zero and an opacity for all values smaller than the element are also zero.

14. The system of claim 12, wherein the at least one processor is configured to execute the computer-readable instructions to cause the system to,
   determine a color function of a ray among an initial color function and a modified color function, the modified color function associated with the uniform value;
   determine an opacity function of a ray among an initial opacity function and a modified opacity function, the modified opacity function associated with the uniform value,
      the determined color function being the modified color function when an opacity at an arc length is less using the modified opacity function than an opacity at the arc length using the initial opacity function,
      the determined opacity function being the modified opacity function when the opacity at the arc length is less using the modified opacity function than the opacity at the arc length using the initial opacity function; and
   apply the determined color function and the determined opacity function to the voxel data.

15. The system of claim 14, wherein the determined color function represents color values over intervals of the ray, respectively, and the determined opacity function represents opacity values over the intervals, respectively, of the ray.

16. The system of claim 14, wherein the at least one processor is configured to execute the computer-readable instructions to cause the system to determine a boundary using a binary optimization mask.

17. The system of claim 12, wherein the at least one processor is configured to execute the computer-readable instructions to cause the system to, modify a second portion of the voxel data by setting the second portion of the voxel data to a second uniform value, the second portion of the voxel data associated with a second segmentation mask; and apply the set of operators to the modified second portion of the voxel data and the first portion of the voxel data, wherein the at least one processor is configured to execute the computer-readable instructions to display the volume based on the applied set of operators to the modified first portion of the voxel data and the applied set of operators to the modified second portion of the voxel data.

18. The system of claim 12, wherein the at least one of the plurality of permitted voxel values is an optimized value.

19. The system of claim 12, wherein the first segmentation mask is a first show mask and the at least one processor is configured to execute the computer-readable instructions to cause the system to, modify a second portion of the voxel data by setting the second portion of the voxel data to at least one of a second plurality of permitted voxel values, the second portion of the voxel data associated with a second show mask;

apply the set of operators to the modified second portion of the voxel data and the voxel data excluding the modified second portion; and display the volume based on the applied set of operators.

20. A non-transitory computer-readable medium, when executed by at least one processor, configured to cause the at least one processor to, obtain voxel data;

modify a first portion of the voxel data, the first portion of the voxel data associated with a first segmentation mask, by setting the first portion of the voxel data to a uniform value, the uniform value being within a plurality of permitted voxel values, by determining the plurality of permitted voxel values, and determining the uniform value as the largest value within the plurality of permitted voxel values;

apply a set of operators to the modified first portion of the voxel data and a remaining portion of the voxel data; and display a volume based on the applied set of operators.

* * * * *